US005190842A

United States Patent [19]

Saha et al.

[11] Patent Number: 5,190,842

[45] Date of Patent: Mar. 2, 1993

[54] TWO PHASE FERROELECTRIC-FERROMAGNETIC COMPOSITE CARRIER

[75] Inventors: Bijy S. Saha; Alec N. Mutz, both of Rochester; Robert E. Zeman, Webster, all of N.Y.

[73] Assignee: Eastman Kodak Company, Rochester, N.Y.

[21] Appl. No.: 810,628

[22] Filed: Dec. 19, 1991

[51] Int. Cl.[5] ........ G03G 9/107; C04B 35/26

[52] U.S. Cl. ........ 430/106.6; 430/108; 430/122; 252/62.63

[58] Field of Search ........ 430/106.6, 108, 122; 252/62.63

[56] References Cited

U.S. PATENT DOCUMENTS

| | | | |
|---|---|---|---|
| 3,053,770 | 12/1962 | Counts | 252/62.63 |
| 3,713,819 | 1/1973 | Hagenbach et al. | 430/120 |
| 3,716,630 | 2/1973 | Shirk | 252/62.63 |
| 3,725,283 | 4/1973 | Fenity | 430/108 |
| 3,795,617 | 3/1974 | McCabe | 430/108 |
| 3,795,618 | 3/1974 | Kasper | 430/108 |
| 3,893,935 | 7/1975 | Jadwin et al. . | |
| 3,938,992 | 2/1976 | Jadwin et al. . | |
| 3,941,898 | 3/1976 | Sadamatsu et al. | 430/109 |
| 4,076,857 | 2/1978 | Kasper et al. . | |
| 4,124,385 | 11/1978 | O'Horo | 252/62.63 |
| 4,124,735 | 11/1978 | O'Horo | 252/62.63 |
| 4,126,437 | 11/1978 | O'Horo | 430/108 |
| 4,336,173 | 6/1982 | Ugelstad | 523/205 |
| 4,341,684 | 7/1982 | Kubo et al. | 252/62.63 |
| 4,394,430 | 7/1983 | Jadwin et al. | 430/110 |
| 4,407,721 | 10/1983 | Koike et al. | 252/62.59 |
| 4,459,378 | 7/1984 | Ugelstad | 523/205 |
| 4,473,029 | 9/1984 | Fritz et al. | 430/122 |
| 4,546,060 | 10/1985 | Miskinis et al. | 430/108 |
| 4,623,603 | 11/1986 | Iimura et al. | 430/108 |
| 4,764,445 | 9/1988 | Miskinis et al. | 430/108 |
| 4,806,265 | 2/1989 | Suzuki et al. | 252/62.63 |
| 4,824,587 | 4/1989 | Kwon et al. | 252/62.55 |
| 4,855,206 | 12/1989 | Graalman et al. | 428/316.6 |
| 4,885,205 | 2/1989 | Wahl et al. | 428/285 |
| 4,957,812 | 9/1990 | Aoki et al. | 428/329 |
| 5,061,586 | 10/1991 | Saha et al. | 430/108 |
| 5,104,761 | 4/1992 | Saha et al. | 430/108 X |
| 5,106,714 | 4/1992 | Saha et al. | 430/108 X |

FOREIGN PATENT DOCUMENTS

| | | | |
|---|---|---|---|
| 31864 | 2/1987 | Japan | 430/108 |
| 35369 | 2/1987 | Japan | 430/106.6 |
| 228674 | 9/1990 | Japan | 430/108 |
| 1501065 | 2/1978 | United Kingdom . | |

*Primary Examiner*—Roland Martin
*Attorney, Agent, or Firm*—Willard G. Montgomery

[57] ABSTRACT

Disclosed is an interdispersed two-phase ferrite composite which comprises, as a ferromagnetic phase, a magnetically hard ferrite material having a hexagonal crystalline structure of the general formula $MO.6Fe_2O_3$ in which M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, in which the mole ratio of the ferromagnetic phase to the ferroelectric phase is from about 1:1 to about 1:4.

Also disclosed are carrier particles formed from magnetized particles of the composite which optionally can be polymerically coated, an electrostatic two-component dry developer composition comprising electrically insulative charged toner particles mixed with oppositely charged carrier particles formed from magnetized, and optionally polymerically coated, particles of the composite suitable for extremely high speed copying applications without the loss of copy image quality, and a method of developing an electrostatic image by contacting the image with a two-component dry developer composition described above.

27 Claims, No Drawings

TWO PHASE FERROELECTRIC-FERROMAGNETIC COMPOSITE CARRIER

FIELD OF THE INVENTION

This invention relates to hard ferrite magnetic carriers for use in electrostatographic copy machines. More particularly, it relates to an interdispersed two-phase ferrite composite consisting of a ferromagnetic phase and a ferroelectric phase for use in such carriers.

BACKGROUND OF THE INVENTION

In electrography, an electrostatic charge image is formed on a dielectric surface, typically the surface of the photoconductive recording element or photoconductor. Development of this image is commonly achieved by contacting it with a dry, two-component developer comprising a mixture of pigmented resinous electrically insulative particles known as toner, and magnetically attractable particles, known as carrier. The carrier particles serve as sites against which the non-magnetic toner particles can impinge and thereby acquire a triboelectric charge opposite to that of the electrostatic image. The toner particles are held on the surface of the relatively larger-sized carrier particles by the electric force generated by the friction of both particles as they impinge upon and contact one another during mixing interactions. During contact between the electrostatic image and the developer mixture, the toner particles are stripped away from the carrier particles to which they had formerly adhered (via triboelectric forces) by the relatively strong attractive force of the electric field formed by the charge image which overcomes the bonding forces between the toner particles and the carrier particles. In this manner, the toner particles are attracted by the electrostatic forces associated with the charge image and deposited on the electrostatic image to render it visible.

It is known in the art to apply developer compositions of the above type to electrostatic images by means of a rotating-core magnetic applicator which comprises a cylindrical developing sleeve or shell of a non-magnetic material having a magnetic core positioned within. The core usually comprises a plurality of parallel magnetic strips which are arranged around the core surface to present alternative north and south magnetic fields. These fields project radially, through the sleeve, and serve to attract the developer composition to the sleeve's outer surface to form a brush nap, or what is commonly referred to in the art as, a "magnetic brush". It is essential that the magnetic core be rotated during use to cause the developer to advance from a supply sump to a position in which it contacts the electrostatic image to be developed. The cylindrical sleeve, or shell, may or may not also rotate. If the shell does rotate, it can do so either in the same direction as or in a different direction from the core. After development, the toner depleted carrier particles are returned to the sump for toner replenishment. The role of the carrier is two-fold: (a) to transport the toner particles from the toner sump to the magnetic brush, and (b) to charge the toner by triboelectrification to the desired polarity, i.e., a polarity reverse to that of the polarity of the charge of the electrostatic image on the photoconductive recording element or plate, and to charge the toner to the proper or desired degree (amount) of charge. The magnetic carrier particles, under the influence of the magnets in the core of the applicator, form fur-like hairs or chains extending from the developing sleeve or shell of the applicator. Since the charge polarity of the magnetic carrier is the same as that of the electrostatic image, the magnetic carrier is left on the developing sleeve of the applicator after the toner particles have been stripped away from the carrier during development of the electrostatic or charge image. Typically, a bias voltage is applied between the photosensitive material or plate and the developing sleeve of the magnetic applicator by means of an electric current externally applied to the developing sleeve or shell which flows through the magnetic brush. The purpose of the bias voltage primarily is to prevent, or at least substantially reduce, the occurrence of unwanted toner fogging or background development caused by the migration of a certain portion of the toner particles available for development from the carrier to a non-image area or portion of the photosensitive plate (or drum) during development due to an incomplete discharge of such non-image areas during exposure. Commonly referred to as background charge, these areas of incomplete discharge cause an attraction for and a migration of some of the available toner particles (particularly those toner particles possessing an insufficient quantity of charge) to the partially discharged areas during development which results in the development or coloration of areas of the electrostatic image pattern that should not be developed. Hence the term, "background development". The polarity of the bias voltage should be the same as the charge polarity of the photosensitive material. Namely, if the charge polarity of the photosensitive material or plate is positive, the positive polarity is selected for the bias voltage. Caution must be exercised in selecting the proper amount of bias voltage applied between the photosensitive material and the developing sleeve so that problems such as discharge breakdown are not caused in the photosensitive material or the magnetic brush or that toner migration of the toner particles from the carrier to the electrostatic image to be developed is not prevented due to the application of a disproportionate or excessive amount of bias voltage to the magnetic brush during development. Ordinarily, it is typical that the bias voltage be controlled to about 100 to 300 volts, particularly about 150 to 250 volts. This particular method of toner development is commonly referred to in the art as magnetic brush development.

Conventionally, carrier particles made of soft magnetic materials have been employed to carry and deliver the toner particles to the electrostatic image. U.S. Pat. Nos. 4,546,060 and 4,473,029, teach the use of hard magnetic materials as carrier particles and an apparatus for the development of electrostatic images utilizing such hard magnetic carrier particles, respectively. These patents require that the carrier particles comprise a hard magnetic material exhibiting a coercivity of at least 300 Oersteds when magnetically saturated and an induced magnetic moment of at least 20 EMU/g when in an applied magnetic field of 1000 Oersteds. The terms "hard" and "soft" when referring to magnetic materials have the generally accepted meaning as indicated on page 18 of *Introduction To Magnetic Materials* by B. D. Cullity published by Addison-Wesley Publishing Company, 1972. As disclosed in aforementioned U.S. Pat. No. 4,546,060, when magnetic carrier particles which (a) contain a magnetic material exhibiting a coercivity of at least 300 Oersteds and (b) have an induced magnetic moment of at least 20 EMU/g when in an external magnetic field of 1000 Oersteds are exposed to a succession of magnetic fields emanating from the rotating core applicator, the particles interact with the moving fields to cause a turbulent rapid flow of developer as they flip or turn to move into magnetic alignment in each new field. Each flip, as a consequence of both the magnetic moment of the particles and the coercivity of the magnetic material, is accompanied by a rapid circumferential step by each particle in a direction opposite the movement of the rotating core. The observed effect is that the developer flows smoothly and at a rapid rate around the shell while the core rotates in the opposite direction resulting in a high level of triboelectrification of the toner while residing on the brush and the rapid delivery of fresh toner to the photoreceptor or photoconductive element thereby facilitating high-speed copying applications while providing for the complete development of electrostatic images at high-speed copying rates. In addition to providing development rates suitable for high-speed copying applications without the loss of image quality, the magnetic moment of the carrier particles is sufficient to prevent the carrier from transferring to the electrostatic image during development, i.e., there is provided sufficient magnetic attraction between the applicator and the carrier particles to hold the latter on the applicator shell during core rotation and thereby prevent the carrier from transferring to the image (i.e., carrier pick-up). These hard magnetic carrier materials represent a significant advancement in the art over the previously used soft magnetic carrier materials in that the speed of development is remarkably increased without experiencing a deterioration of the image. Speeds as high as four times the maximum speed utilized in the use of soft magnetic carrier particles have been demonstrated.

The above two mentioned U.S. patents, while generic to all hard magnetic materials having the properties set forth, prefer the hard magnetic ferrites which are compounds of barium and/or strontium such as, $BaFe_{12}O_{19}$, $SrFe_{12}O_{19}$, and the magnetic ferrites having the formula $MO.6Fe_2O_3$, where M is barium, strontium or lead as disclosed in U.S. Pat. No. 3,716,630. While these hard ferrite carrier materials represent a substantial increase in the speed with which development can be conducted in an electrostatic apparatus, it has been found that development speed, i.e., development efficiency, progressively decreases in developer compositions comprising such hard ferrite magnetic carrier materials and oppositely charged toner particles as the particle size of the toner progressively decreases below about 8 micrometers. In addition, it has also been found that as the particle size of the toner progressively decreases below about 8 micrometers in such developer compositions, the density of the toned images produced thereby also decreases due to the inability of enough toner particles to be supplied to the development zone at a rate rapid enough to enable the complete development of the image. This is particularly noticeable in the solid, colored image area portions of the toner image which appear lighter or fainter in appearance than desired. This decrease in development or copying speed and toner image density is believed to be due primarily to the fact that the hard ferrite magnetic carrier particles of the prior art, such as those disclosed in U.S. Pat. No. 4,546,060, for example, depend solely upon triboelectrifcation or friction-charging of the toner particles as they impinge upon and intermix with the toner particles on the magnetic brush to attract the toner particles to the carrier particles and to adhere the toner particles to the carrier particle surface for transport to the development zone for development of the charge image. While friction-charging alone is sufficient to provide an adequate amount of toner particles to the development zone at a rate rapid enough to achieve the high development speeds and toner image densities referred to above when the toner particles used in the developer compositions along with the hard ferrite magnetic carrier particles have a particle size of approximately 8 micrometers or greater, friction-charging alone is not sufficient to provide such high development speeds and toner image densities when the particle size of the toner particles in such developer compositions falls below about 8 micrometers in diameter. This is believed to be due to the following. As the size of the toner particles used in the developer compositions progressively decreases below about 8 micrometers, the tendency of the individual toner particles in the toner supply sump to agglomerate or stick together and form clumps progressively increases due to the presence of very strong attractive surface forces among these very small-sized individual toner particles, such as those caused by Van der Vaals interactions, which cause a certain amount or portion of the individual toner particles to be attracted to one another and to form large clumps or agglomerates of toner particles. Since the surface areas provided by such agglomerates or clumps of toner particles which are available for tribo-charging by the carrier particles are much less than the surface areas of the individual toner particles that make-up the agglomerates or clumps that would otherwise be available for tribo-charging by the carrier particles , the amount of toner which is available for tribo-charging by the carrier particles and development of the charge image is reduced. As a result, development speed or efficiency is decreased, as is toner image density, because an adequate amount of toner particles cannot be supplied to the development zone at a rate fast enough to enable complete image development. This is unfortunate because in order to produce copies of very high resolution, it is necessary to use toner particles that have a very small particle size, i.e., less than about 8 micrometers. (Particle size herein refers to mean volume weighted diameter as measured by conventional diameter measuring devices such as a Coulter Multisizer, sold by Coultor, Inc. Mean volume weighted diameter is the sum of the mass of each particle times the diameter of a spherical particle of equal mass and density, divided by total particle mass).

Accordingly, it would be highly desirable to be able to provide hard ferrite magnetic materials for use as carrier particles, such as the aforedescribed barium, strontium, and lead ferrites having the formula $MO.6Fe_2O_3$, where M is barium, strontium or lead, which not only possess the required magnetic properties necessary for providing high speed development and high copy image quality when used in developer compositions comprising such carrier particles and oppositely charged toner particles having particle sizes of approximately 8 micrometers or greater, but which also possess the necessary properties required to provide such high speed development and high copy image quality, when utilized in developer compositions comprising oppositely charged toner particles having particle sizes of less than about 8 micrometers. The present invention provides such carrier particles.

SUMMARY OF THE INVENTION

We have now discovered that the properties of the hard ferrite magnetic carrier particles described in aforementioned U.S. Pat. No. 4,546,060 and U.S. Pat. No. 4,473,029, can be further improved by the addition of a ferroelectric material or substance, such as $BaTiO_3$, to the hard ferrite magnetic materials described therein to form hard magnetic interdispersed two-phase ferrite composite structures consisting of a ferromagnetic phase and a ferroelectric phase which can be used to provide carrier particles for use in developer compositions with oppositely charged toner particles having particle sizes of 8 micrometers or less to provide developed electrostatic images of extremely high image density and at extremely high development speeds. The hard, magnetic interdispersed two-phase ferrite composite structures of the present invention consist of a ferromagnetic phase comprised of a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and a ferroelectric phase comprised of a suitable ferroelectric material such as a material selected from the double oxides of titanium, zirconium, tin, hafnium or germanium and either an alkaline earth or lead or cadmium. In the ferrite composites of the present invention, the mole ratio of the ferromagnetic phase to the ferroelectric phase is from about 1:1 to about 1:4.

The term "ferroelectric material" or "ferroelectric substance" is used herein to define any crystalline dielectric material that can be spontaneously polarized by the application of an electric field to the material or substance.

Accordingly, there is now provided an interdispersed two-phase ferrite composite which comprises, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, wherein the mole ratio of the ferromagnetic phase to the ferroelectric phase is from about 1:1 to about 1:4.

Also provided are carrier particles for use in the development of electrostatic images which comprise a hard magnetic interdispersed two-phase ferrite composite which comprises, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, in which the mole ratio of the ferromagnetic phase to the ferroelectric phase is from about 1:1 to about 1:4.

Further provided are two-component dry electrostatic developers for use in the development of electrostatic images which comprise a mixture of charged toner particles and oppositely charged carrier particles comprising a hard magnetic interdispersed two-phase ferrite composite comprising, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, in which the mole ratio of the ferromagnetic phase to the ferroelectric phase is from about 1:1 to about 1:4.

Still further, there is provided a method of developing an electrostatic image on a surface which comprises contacting the image with a two-component dry electrostatographic developer composition which comprises a mixture of charged toner particles and oppositely charged carrier particles comprising a hard magnetic interdispersed two-phase ferrite composite which comprises, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, wherein the mole ratio of the ferromagnetic phase to the ferroelectric phase is from about 1:1 to about 1:4.

DETAILED DESCRIPTION OF THE INVENTION

As mentioned previously, when "hard" magnetic materials such as those materials having the formula $MO.6Fe_2O_3$ where M is barium, strontium or lead disclosed in U.S. Pat. Nos. 4,546,060 and 4,473,029 (the disclosures of which are incorporated herein by reference) are used as carrier particles in developer compositions comprising oppositely charged toner particles having particle sizes of approximately 8 micrometers or greater, the speed of development is dramatically increased as compared to those carrier particles of the prior art made of "soft" magnetic particles. However, while the speed with which development can be carried out using such hard magnetic ferrite materials is much higher than the speed with which development can be carried out using the so-called "soft" magnetic materials, there is a progressive decrease in development and copying speed, as well as toner image density, as the size of the toner particles used in developer compositions containing these hard magnetic ferrite carrier particles progressively decreases below about 8 micrometers.

Quite surprisingly, Applicants have found that the aforementioned problems can be overcome by the addition of a ferroelectric material or substance to the hard ferrite magnetic materials of the prior art such as those described in U.S. Pat. Nos. 4,546,060 and 4,473,029. Specifically, Applicants have discovered that the addition of a ferroelectric material or substance to the hard ferrite magnetic materials described above, results in the formation of a hard magnetic interdispersed two-phase ferrite composite consisting of both a ferromagnetic phase of one or more of the aforedescribed hard ferrite magnetic materials and a ferroelectric phase consisting of a crystalline ferroelectric material or substance, such as barium titanate, which can be used to produce magnetic carrier particles for use in developer compositions comprising such carrier particles and oppositely charged toner particles having particle sizes of 8 micrometers or less to provide developed electrostatic images of excellent image density and high resolution at extremely high development speeds. While it is not the intent to be bound by any theory or mechanism by which copying speed or development efficiency, and hence toner image density, is increased by the composite carrier particles of the present invention, it is believed that increased development speed and toner image density is due to the following.

By adding a ferroelectric material or substance to the hard ferrite magnetic carrier materials of the prior art, a composite carrier material can be formed consisting of both a ferromagnetic phase and a ferroelectric phase which can respond simultaneously both to the magnetic field emanating from the magnetic core of the rotating-core magnetic applicator and the bias voltage applied to the magnetic brush on the rotating-core magnetic applicator to increase the amount of toner particles which can be attracted to the carrier particles and transported to the development zone for development of the charge image. By increasing the amount of toner available for development of the electrostatic image, the rate or speed of development can be increased as well as the toner image density, since an adequate amount or supply of toner can be provided to the development zone at a rate or speed rapid enough to insure high development speeds and complete toner image development. More specifically, in addition to utilizing the high magnetic properties of the ferromagnetic phase or regions of the carrier particle composites of the present invention to insure the normal smooth, rapid flow of the carrier around the developing sleeve or shell of the rotating-core magnetic applicator to transport the toner particles from the supply sump to the magnetic brush and to triboelectrically charge the toner particles while residing on the brush to a polarity opposite to that of the charge image, the bias voltage, normally applied to the magnetic brush to prevent toner fogging and background development, can also be utilized, because of the presence of a ferroelectric material or phase in the composite carrier particles of the present invention, to charge inject the toner particles as they come into contact with the carrier particles in the supply sump to attract even more toner particles to the carrier particle surface for transport to the development zone for development of the charge image. That is, upon exposure to the bias voltage present on the magnetic brush, the ferroelectric phase or regions of the composite carrier particles become spontaneously polarized and act as sites of charge injection on toner particles in the vicinity of and adjacent to the carrier particles thereby the enhancing toner charging capabilities of the carrier particles in addition to the conventional tribo-charging properties of the carrier particles. Upon the application of the bias voltage to the magnetic brush, the ferromagnetic regions of the composite carrier particles remain inert to the bias voltage so that normal tribo-charging by the ferromagnetic regions or portions of the carrier particles remains unaffected. In this manner, more of the very small-sized toner is available for transport to the development zone for development of the electrostatic image so that higher development speeds and toner image densities can be achieved using these very small-sized toner particles having particle sizes of less than about 8 micrometers which are so important for producing image copies of very high resolution.

While development speed is generally referred to in the prior art, a more meaningful term is to speak of "development efficiency.. For example, in a magnetic brush development system, development efficiency is defined as the potential difference between the photosensitive material or photoreceptor in developed image areas before and after development divided by the potential difference between the photoreceptor and the brush prior to development times 100. Thus, for example, if the photoreceptor film voltage is $-250$ volts and the magnetic brush is $-50$ volts, the potential difference is $-200$ volts prior to development. If, during development, the film voltage is reduced by 100 volts to $-150$ volts in image areas by the deposition of positively charged toner particles, the development efficiency is ($-100$ volts divided by $-200$ volts)$\times$100, which gives an efficiency of development of 50 percent. From the foregoing, it can readily be seen that as the efficiency of the developer material increases, the speed of the development step can be increased in that as the efficiency increases more toner can be deposited under the same conditions in a shorter period of time. However, in order to obtain high quality copies of the original image, it is necessary to maintain the high magnetic properties of the carrier particles, i.e., a coercivity of at least 300 Oersteds when magnetically saturated and an induced magnetic moment of at least 20 EMU/g when in an applied field of 1000 Oersteds, to insure the smooth, rapid rate of developer flow around the shell or developing sleeve of the rotating-core magnetic applicator to transport the toner from the toner supply sump to the magnetic brush and the triboelectrification of the toner particles while residing on the brush and to prevent the carrier from transferring to the charge image (i.e., carrier pick-up), while at the same time increasing the ability of the carrier particles to deliver toner particles to the photoreceptor at a higher rate.

The present invention contemplates the addition of a ferroelectric substance, such as barium titanate, to a hard magnetic ferrite material of the prior art, aforediscussed, to form a hard magnetic interdispersed two-phase ferrite composite having a ferromagnetic phase and a ferroelectric phase to increase both the amount of toner particles having particle sizes of 8 micrometers or less which the hard magnetic ferrite material can deliver to the photoreceptor, and the rate of efficiency at which such toner particles can be delivered to the photoreceptor by the hard magnetic ferrite composite material.

The preparation of ferrites generally, and hard hexagonal ferrites (Ba, Sr, or Pb) particularly, are well documented in the literature and are disclosed, for example, in U.S. Pat. Nos. 3,716,630; 4,623,603; and 4,042,518;

European Patent Application 0,086,445; "Spray Drying" by K. Masters, published by Leonard Hill Books London, pages 502-509 and "Ferromagnetic Materials", Volume 3 edited by E. P. Wohlfarth and published by North Holland Publishing Company, Amsterdam, N.Y., page 315 et seq. The two-component ferromagnetic-ferroelectric materials of the present invention are prepared in a similar manner as described above. For example, a typical preparation procedure might consist of mixing the oxides of iron and titanium with barium carbonate in the appropriate proportions using an organic binder and water and spray-drying the mixture to form a fine, dry particulate. The particulate is then fired between about 900° C. and 1300° C., to produce the ferrite composite. A two-step firing cycle is used in preparing the interdispersed two-phase ferrite composites of the invention. The first step consists of firing the particulate at 800° C. for approximately 0.5 hour followed by a subsequent or second firing of the particulate at approximately 1010° C. for about 10 hours. A two-step firing cycle is used in order to guarantee the purity of composition of the individual ferroelectric and ferromagnetic phases within the composite particulate material by preventing unwanted cross-reactions between the various chemical constituents which make up the starting materials for the composite particulate. For example, if a ferroelectric phase of pure $BaTiO_3$ is desired in the resultant composite material, it is absolutely critical that titanium dioxide react only with barium oxide in preparing the composite material and not some other reactant also used as a starting material in the process such as, for example, iron oxide. Otherwise, a ferroelectric phase of pure $BaTiO_3$ will not be obtained and the properties and the composite carrier particle will be diluted. The composite is then magnetized and typically coated with a polymer, as is well known in the art, to better enable the carrier particles to triboelectrically charge the toner particles. The layer of resin on the carrier particles should be thin enough so that the mass of particles remains conductive. Preferably, the resin layer is discontinuous so that spots of bare ferrite on each particle provide conductive contact. The carrier particles can be passed through a sieve to obtain the desired range of sizes. A typical particle size, including the polymer coating, is about 5 to about 60 micrometers, but small sized carrier particles, about 5 to about 40 micrometers, are preferred as they produce a better quality image. If a polymer coating is not used, however, a suitable particle size would still be from about 5 to 60 micrometers, more preferably from about 5 to 40 micrometers.

In accordance with the invention, the ferroelectric material or substance used herein is comprised of the double oxides of titanium, zirconium, tin, hafnium or germanium and either an alkaline earth, in particular barium, calcium and strontium; or lead or cadmium; in particular the titantes, zirconates and stannates of one or more of the alkaline earths, cadmium or lead, such as, strontium titanate ($SrTiO_3$), lead titanate ($PbTiO_3$), strontium zirconate ($SrZrO_3$), lead zirconate ($PbZrO_3$), lead stannate ($PbSnO_3$), barium titanate ($BaTiO_3$), calcium titanate ($CaTiO_3$), barium zirconate ($BaZrO_3$), calcium zirconate ($CaZrO_3$), barium stannate ($BaSnO_3$), barium strontium titanate ($BaSrTiO_3$), barium calcium titanate ($BaCaTiO_3$), cadmium zirconate ($CdZrO_3$) and mixtures thereof. Other ferroelectric materials which can be used in the practice of the present invention include sodium potassium tartarate, glycine sulfate and mixtures thereof. A preferred ferroelectric material is barium titanate.

The composite ferrite carrier particles of the invention exhibit a high coercivity of at least 300 Oersteds, typically about 1000 to 3000 Oersteds, when magnetically saturated and an induced magnetic moment of at least 20 EMU/g of carrier in an applied field of 1000 Oersteds. Preferred particles have an induced magnetic moment of about 30 to about 70 EMU/g of carrier in an applied field of 1000 Oersteds. A high coercivity is desirable as it results in better carrier flow on the brush, which results in a higher charge on the toner and more delivery of the toner to the photoconductor. This, in turn, translates into higher development speeds. A high induced magnetic moment is desirable since it prevents or substantially reduces carrier pick-up.

The coercivity of a magnetic material refers to the minimum external magnetic force necessary to reduce the induced magnetic moment from the remanence value to zero while it is held stationary in the external field and after the material has been magnetically saturated, i.e., the material has been permanently magnetized. A variety of apparatus and methods for the measurement of coercivity of the present carrier particles can be employed, such as a Princeton Applied Research Model 155 Vibrating Sample Magnetometer, available from Princeton Applied Research Co., Princeton N.J. The powder is mixed with a non-magnetic polymer powder (90% magnetic powder: 10% polymer by weight). The mixture is placed in a capillary tube, heated above the melting point of the polymer, and then allowed to cool to room temperature. The filled capillary tube is then placed in the sample holder of the magnetometer and a magnetic hysteresis loop of external field (in Oersteds) versus induced magnetism (in EMU/g) is plotted. During this measurement, the sample is exposed to an external field of 0 to 10,000 Oersteds.

In the composite materials of the present invention, it is important that the molar ratio of the ferromagnetic phase to the ferroelectric phase be closely maintained at approximately 1 mole of the ferromagnetic phase to about 1 to 4 moles of the ferroelectric phase. If too little of the ferroelectric phase is present, the benefits of the invention, i.e., high development speeds and high image density will not be obtained. Conversely, if more of the ferroelectric phase is present, the magnetic properties of the ferromagnetic phase will be diluted or reduced.

The novel developers of the present invention comprise two alternative types of carrier particles. The first of these carriers comprises a binder-free magnetic particulate material exhibiting the requisite ferromagnetic properties of coercivity and induced magnetic moment and the requisite ferroelectric properties. This type is preferred.

In the second developer, each carrier particle is heterogeneous and comprises a composite of a binder and a magnetic material exhibiting the requisite ferromagnetic and ferroelectric properties. The ferromagnetic-ferroelectric composite material is dispersed as discrete smaller particles throughout the binder; that is, each composite carrier particle comprises a discontinuous particulate magnetic material consisting of a ferromagnetic phase of the requisite coercivity and induced magnetic moment and a ferroelectric phase of the requisite ferroelectric properties in a continuous binder phase.

The individual bits of the ferromagnetic-ferroelectric material should preferably be of a relatively uniform size and sufficiently smaller in diameter than the composite carrier particle to be produced. Typically, the average diameter of the material should be no more than about 20 percent of the average diameter of the carrier particle. Advantageously, a much lower ratio of average diameter of ferromagnetic-ferroelectric component to carrier can be used. Excellent results can be obtained with ferromagnetic-ferroelectric powders of the order of 5 micrometers down to 0.05 micrometer average diameter. Even finer powders can be used when the degree of subdivision does not produce unwanted modifications in the ferromagnetic and ferroelectric properties and the amount and character of the selected binder produce a carrier particle of satisfactory strength, together with other desirable mechanical and electrical properties in the resulting carrier particle.

The concentration of the ferromagnetic-ferroelectric composite material can vary widely. Proportions of finely divided material, from about 20 percent by weight to about 90 percent by weight, based on the total weight of the composite carrier, can be used.

The induced magnetic moment of composite carriers in a 1000 Oersted applied field is dependent on the composition and concentration of the magnetic material in the particle. It will be appreciated, therefore, that the induced moment of the magnetic material in the ferromagnetic-ferroelectric carrier particle should be sufficiently greater than 20 EMU/g to compensate for the effect upon such induced moment from dilution of the magnetic material in the binder. For example, one might find that, for a concentration of 50 weight percent ferromagnetic-ferroelectric material in the composite particles, the 1000 Oersted induced magnetic moment of the material should be at least 40 EMU/g to achieve the minimum level of 20 EMU/g for the composite particles.

The binder material used with the finely divided ferromagnetic-ferroelectric material is selected to provide the required mechanical and electrical properties. It should (1) adhere well to the ferromagnetic-ferroelectric material, (2) facilitate the formation of strong, smooth-surfaced particles and (3) preferably possess sufficient difference in triboelectric properties from the toner particles with which it will be used to aid in insuring the proper polarity and magnitude of electrostatic charge between the toner and carrier when the two are mixed.

The matrix can be organic, or inorganic, such as a matrix composed of glass, metal, silicone resin or the like. Preferably, an organic material is used such as a natural or synthetic polymeric resin or a mixture of such resins having appropriate mechanical properties. Appropriate monomers (which can be used to prepare resins for this use) include, for example, vinyl monomers, such as alkyl acrylates, and methacrylates, styrene and substituted styrenes, basic monomers such as vinyl pyridines, etc. Copolymers prepared with these and other vinyl monomers such as acidic monomers, e.g., acrylic or methacrylic acid, can be used. Such copolymers can advantageously contain small amounts of polyfunctional monomers such as divinylbenzene, glycol dimethylacrylate, triallyl citrate and the like. Condensation polymers such as polyesters, polyamides or polycarbonates also can be employed.

Preparation of composite carrier particles according to this invention may involve the application of heat to soften thermoplastic material or to harden thermosetting material; evaporative drying to remove liquid vehicle; the use of pressure or of heat and pressure, in molding, casting, extruding, etc., and in cutting or shearing to shape the carrier particles; grinding, e.g., in ball mill to reduce carrier material to appropriate particle size; and sifting operations to classify the particles.

According to one preparation technique, the powdered ferromagnetic-ferroelectric composite material is dispersed in a solution of the binder resin. The solvent may then be evaporated and the resulting solid mass subdivided by grinding and screening to produce carrier particles of appropriate size.

According to other techniques, emulsion or suspension polymerization and limited coalescence, as described in U.S. Pat. Nos. 2,932,629 and 4,833,060, respectively are used to produce uniform carrier particles of excellent smoothness and useful life.

As discussed previously, carrier particles of the invention are employed in combination with toner particles to form a dry, two-component composition. In use, the toner particles are electrostatically attracted to the electrostatic charge pattern on an element while the carrier particles remain on the applicator shell. This is accomplished in part by intermixing the toner and carrier particles so that the carrier particles acquire a charge of one polarity and the toner particles acquire a charge of the opposite polarity. The charge polarity on the carrier is such that it will not be electrically attracted to the electrostatic charge pattern. The carrier particles also are prevented from depositing on the electrostatic charge pattern because the magnetic attraction exerted between the rotating core and the carrier particles exceeds the electrostatic attraction, which may arise between the carrier particles and the charge image.

Tribo-charging of toner and "hard" ferromagnetic-ferroelectric carrier is achieved by selecting materials that are so positioned in the triboelectric series to give the desired polarity and magnitude of charge when the toner and carrier particles intermix. If the carrier particles do not charge as desired with the toner employed, the carrier can be coated with a material which does. Such coating can be applied to either composite or binder-free particles as described herein. The polarity of the toner charge, moreover, can be either positive or negative.

Various resin materials can be employed as a coating on the "hard" ferromagnetic-ferroelectric carrier particles. Examples include those described in J. McCabe U.S. Pat. No. 3,795,617; G. Kasper U.S. Pat. No. 3,795,618, and G. Kasper U.S. Pat. No. 4,076,857. The choice of resin will depend upon its triboelectric relationship with the intended toner. For use with toners which are desired to be positively charged, for example, preferred resins for the carrier coating include fluorocarbon polymers such as poly(tetrafluoroethylene); poly(vinylidene fluoride) and poly(vinylidene fluoride-co-tetrafluoroethylene).

The carrier particles can be coated with a tribocharging resin by a variety of techniques such as solvent coating, spray application, plating, tumbling or melt coating. In melt coating, a dry mixture of "hard" ferromagnetic-ferroelectric particles with a small amount of powdered resin, e.g., 0.05 to 5.0 weight percent resin is formed, and the mixture heated to fuse the resin. Such a low concentration of resin will form a thin or discontinuous layer of resin on the carrier particles.

The developer is formed by mixing the particles with toner particles in a suitable concentration. Within the developers of the invention, high concentrations of toner can be employed. Accordingly, the present developers preferably contain from about 70 to 99 weight percent carrier and about 30 to 1 weight percent toner based on the total weight of the developer; most preferably, such concentration if from about 75 to 99 weight percent carrier and from about 25 to 1 weight percent toner.

The toner component of the invention can be a powdered resin which is optionally colored. It normally is prepared by compounding a resin with a colorant, i.e., a dye or pigment, and any other desired addenda. If a developed image of low opacity is desired, no colorant need be added. Normally, however, a colorant is included and it can, in principle be any of the materials mentioned in Colour Index, Vols. I and II, 2nd Edition. Carbon black is especially useful. The amount of colorant can vary over a wide range, e.g., from 3 to 20 weight percent of the polymer. Combinations of colorants may be used.

The mixture is heated and milled to disperse the colorant and other addenda in the resin. The mass is cooled, crushed into lumps and finely ground. The resulting toner particles range in diameter from 0.5 to 25 micrometers although, as mentioned previously, high development efficiencies and excellent image densities can be obtained not only using toner particles having particle diameters of 8 micrometers or more, but also with those having particle diameters below about 8 micrometers.

The toner resin can be selected from a wide variety of materials, including both natural and synthetic resins and modified natural resins, as disclosed, for example, in the patent to Kasper et al, U.S. Pat. No. 4,076,857. Especially useful are the crosslinked polymers disclosed in the patent to Jadwin et al, U.S. Pat. No. 3,938,992, and the patent to Sadamatsu et al, U.S. Pat. No. 3,941,898. The crosslinked or non-crosslinked copolymers of styrene or lower alkyl styrenes with acrylic monomers such as alkyl acrylates of methacrylates are particularly useful. Also useful are condensation polymers such as polyesters.

The shape of the toner can be irregular, as in the case of ground toners, or spherical. Spherical particles are obtained by spray-drying a solution of the toner resin in a solvent. Alternatively, spherical particles can be prepared by the polymer bead swelling technique disclosed in European Patent No. 3,905, published Sep. 5, 1979, to J. Ugelstad.

The toner also can contain minor components such as charge control agents and antiblocking agents. Especially useful charge control agents are disclosed in U.S. Pat. No. 3,893,935 and British Patent No. 1,501,065. Quaternary ammonium salt charge agents as disclosed in Research Disclosure, No. 21030, Volume 210, October, 1981 (published by Industrial Opportunities Ltd., Homewell, Havant, Hampshire, PO9 1EF, United Kingdom), also are useful.

In the method of the present invention, an electrostatic image is brought into contact with a magnetic brush comprising a rotating-magnetic core, an outer non-magnetic shell and the two-component, dry developer described above. The electrostatic image so developed can be formed by a number of methods such as by imagewise photodecay of a photoreceptor, or imagewise application of a charge pattern on the surface of a dielectric recording element. When photoreceptors are employed, such as in high-speed electrophotographic copy devices, the use of halftone screening to modify an electrostatic image can be employed, the combination of screening with development in accordance with the method of the present invention producing high-quality images exhibiting high $D_{max}$ and excellent tonal range. Representative screening methods including those employing photoreceptors with integral half-tone screens are disclosed in U.S. Pat. No. 4,385,823.

Developers including the ferromagnetic-ferroelectric particles in accordance with this invention when employed in an apparatus such as that described in U.S. Pat. No. 4,473,029, exhibit a dramatic increase in development efficiency when compared with a hard ferrite material of the prior art devoid of a ferroelectric phase when operated at the same voltage differential of the magnetic brush and photoconductive film.

The invention is further illustrated by the following examples.

EXAMPLE 1

A two-phase carrier composition of the invention was prepared as follows.

Powders of iron oxide (227.16 grams), barium carbonate (61.67 grams) and titanium oxide (4.99 grams) were mixed thoroughly. In a separate container, a stock solution was prepared by dissolving 4 weight percent (based on the weight of the solution) of a binder resin, i.e., gum arabic and 0.03 weight percent ammonium polymethacrylate surfactant (sold by W. R. Grace and Co. as "Daxad-32") in distilled water. The powders were mixed with the stock solution in a 50:50 weight ratio and the mixture was ball milled for about 24 hours then spray dried in a Niro spray dryer. The green bead particles thus formed were classified to obtain a suitable particle size distribution. The green bead particles were then fired at 800° C. for 0.5 hour and then at 1010° C. for 10 hours. The fired cake thus obtained was deagglomerated and the powder was sieved to be used as a carrier. The resulting carriers had a two-phase composite structure consisting of a ferromagnetic phase of strontium ferrite and a ferroelectric phase of $BaTiO_3$. The mole ratio of the ferromagnetic phase to the ferroelectric phase was 1:2. The saturation magnetism or induced magnetic moment of the carrier particle was approximately 53 EMU/g when in an applied field of 1000 Oersteds as measured herein and the coercivity of the carrier particles was 1000 Oersteds when magnetically saturated as measured herein. The carrier particles were dry coated (230° C.; 4 hours) with 1 pph Kynar 301 fluorocarbon polymer obtained from the Pennwalt Chemical Company, King of Prussia, Pa., which enabled the carrier to charge toner positively. The toner charge, as determined herein, was 135 microcoulombs per gram of toner.

The toner particles comprised a cyan pigmented polyester toner. The toner particles had a mean volume average diameter of 3.6 micrometers.

The developer was formulated by mixing the carrier and the toner. The concentration of the toner was 6 percent by weight of the total developer composition. The carrier particles had a mean volume average diameter of 35 micrometers.

The charge on the toner was, Q/m, in microcoulombs/g, was measured using a standard procedure in which the toner and carrier are placed on a horizontal electrode and are subjected to both an AC magnetic field and a DC electric field. When the toner jumps to the other electrode, the change in the electrical charge is measured and is divided by the weight of the toner that jumped. A control developer also was prepared for comparison consisting of 100 grams of carrier particles consisting only of the ferromagnetic phase (i.e., SrFe12019 without the $BaTiO_3$ ferroelectric phase) described above and 12 grams of the toner powder, i.e., 12 percent by weight of the total developer composition described above. The toner charge, as determined herein, was 248 microcoulombs per gram.

After shaking in separate glass vials for two minutes, the developer compositions prepared as described above were applied to an electrostatic image-containing multiactive organic photoconductive element using a rotating-core magnetic applicator housed on a linear breadboard device having two electrostatic probes, one before the magnetic brush development station and one after the magnetic brush development station to measure the voltage on the photoconductive film or element before and after development. The magnetic applicator included a 5.08 cm outside diameter, non-magnetic stainless steel shell 15.24 cm in axial length. A core containing ten alternating pole magnets was enclosed in the shell which produced a magnetic field of 900-1000 Oersteds on the shell surface. The tests were made while rotating the core of magnets at 200 to 2000 revolutions per minute in a direction counter to the direction in which the photoconductive element moved. The shell of the applicator was rotated at 5 to 50 revolutions per minute. Developer was distributed on the shell from a feed hopper and traveled clockwise around the shell. A trim skive was set to allow a nap thickness of 5–40 mils.

The photoconductive element employed was, as previously discussed, an organic multiactive photoconductive film. The film was a negatively charged reusable film. Electrostatic images were formed thereon by uniformly charging the element to approximately −500 volts and exposing the charged element to an original. The magnetic brush was maintained at approximately −183 volts. The resulting charge images were developed by passing the element over the magnetic brush at speeds of 2.54 and 10.16 cm/sec in the direction of developer flow.

After development, the charge on the photoconductive film in developed areas was measured and the development efficiencies of the respective developer compositions at development speeds of 2.54 cm/sec and 10.16 cm/sec were determined by dividing the potential difference between the photoconductive film in the developed image areas before and after development by the potential difference between the photoreceptor and the brush prior to development and multiplying by 100 and the toner image was electrostatically transferred to a paper receiver of photographic reflection paper stock and thereon fixed by roller fusion at a temperature of approximately 106° C. $D_{max}$ measurements using an X-Rite Model 310 Densitometer manufactured by X-Rite of Grandsville, Mich. equipped with a Class A-filter were taken of a small area (25 mm×7.0 mm) of the developed and fixed images. The background density of the receiver paper was zeroed prior to recording the density of the transferred images.

The development efficiencies of each of the developer compositions at the two development velocities of 2.54 cm/sec and 10.16 cm/sec are shown in the table below as well as the $D_{max}$ values of each. Also, a visual analysis of the graininess of the developed copies was made, the results of which are also included in the table below.

| | % Development Efficiency | |
|---|---|---|
| Developer Velocity | Control Carrier | Ferromagnetic-Ferroelectric Carrier of the Invention |
| 2.54 cm/sec | 58 | 90 |
| 10.16 cm/sec | 37 | 82 |
| Image Quality ($D_{max}$) | 1.3 | 2.55 |
| Grain | High Grain | Low Grain |

The above table shows that the efficiency of development was improved from 58% to 90% at a developer velocity of 2.54 cm/sec and from 37% to 82% at a developer velocity of 10.16 cm/sec using the carrier particles of the present invention, all other conditions of development remaining the same. The table also shows that a higher $D_{max}$ was obtained using the carrier particles of the present invention compared to the control carrier particles composed solely of the ferromagnetic phase and that the graininess of the copy images made using the carrier particles of the present invention was reduced over those copy images produced by the control carrier particles.

"Electrography" and "electrographic" as used herein are broad terms which include image-forming processes involving the development of an electrostatic charge pattern formed on a surface with or without light exposure, and thus, include electrophotography and other processes.

The invention has been described in detail with particular reference to preferred embodiments thereof, but it will be understood that variations and modifications can be effected with the spirit and scope of the invention.

We claim:

1. An interdispersed two-phase ferrite composite which comprises, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, wherein the mole ratio of the ferromagnetic phase to the ferroelectric phase is from about 1:1 to about 1:4.

2. A composite according to claim 1, wherein M is strontium.

3. A composite according to claim 1, wherein M is barium.

4. A composite according to claim 1, wherein M is lead.

5. A composite according to claim 1, wherein said ferroelectric phase is comprised of barium titanate.

6. A composite according to claim 1, wherein said ferroelectric phase is comprised of strontium titanate.

7. A composite according to claim 1, wherein said ferroelectric phase is comprised of lead titanate.

8. A composite according to claim 1, wherein said ferroelectric phase is comprised of strontium zirconate.

9. A particle formed of a composite according to claim 1.

10. A particle according to claim 9, which is generally spherical.

11. A carrier for use in the development of electrostatic images comprising magnetized particles of claim 9.

12. A carrier for use in the development of electrostatic images comprising particles according to claim 9, magnetized and coated with a polymer.

13. A carrier for use in the development of electrostatic images according to claim 12, having a particle size of about 5 to about 60 micrometers in diameter.

14. Carrier particles for use in the development of electrostatic images which comprise a hard magnetic interdispersed two-phase ferrite composite comprising, as a ferromagnetic phase, a magnetically hard ferrite material having a hexagonal crystalline structure of the general formula $MO.6Fe_2O_3$, wherein M is selected from the group consisting of strontium, barium, lead and mixtures thereof, exhibiting a coercivity of at least 300 Oersteds when magnetically saturated and an induced magnetic moment of at least 20 EMU/g when in an applied field of 1000 Oersteds and, as a ferroelectric phase, a ferroelectric material comprised of at least one of the double oxides of titanium, zirconium, tin, hafnium or germanium and either an alkaline earth or lead or cadmium, wherein the mole ratio of the ferromagnetic phaseto the ferroelectric phase is from about 1:1 to about 1:4.

15. Carrier particles of claim 14, wherein said ferromagnetic phase comprises strontium ferrite and said ferroelectric phase comprises barium titanate.

16. A developer comprising about 75 to about 99 weight percent of a carrier according to claim 12, and about 1 to about 25 weight percent of a toner.

17. An electrostatic two-component dry developer composition for use in the development of electrostatic images which comprises a mixture of charged toner particles and oppositely charged carrier particles which comprise a hard magnetic interdispersed two-phase ferrite composite comprising, as a ferromagnetic phase, a magnetically hard ferrite material having a hexagonal crystalline structure of the general formula $MO.6Fe_2O_3$, wherein M is selected from the group consisting of strontium, barium, lead and mixtures thereof exhibiting a coercivity of at least 300 Oersteds when magnetically saturated and an induced magnetic moment of at least 20 EMU/g when in an applied magnetic field of 1000 Oersteds and, as a ferroelectric phase, a ferroelectric material comprised of at least one of the double oxides of titanium, zirconium, tin, hafnium or germanium and either an alkaline earth or lead or cadmium, in which the mole ratio of the ferromagnetic phase to the ferroelectric phase is from about 1:1 to about 1:4.

18. A composition according to claim 17, wherein M is strontium.

19. A composition according to claim 17, wherein M is barium.

20. A composition according to claim 17, wherein M is lead.

21. A composition according to claim 17, wherein said ferroelectric phase is comprised of barium titanate.

22. A composition according to claim 17, wherein said ferroelectric phase is comprised of strontium titanate.

23. A composition according to claim 17, wherein said ferroelectric phase is comprised of lead titanate.

24. A composition according to claim 17, wherein said ferroelectric phase is comprised of strontium zirconate.

25. A composition according to claim 17, wherein the diameter of said toner particles is approximately 8 micrometers or less.

26. A method of developing an electrostatic image comprising contacting the image with a two-component dry developer composition of claim 16.

27. A method of developing an electrostatic image comprising contacting the image with a two-component dry developer composition of claim 17.

* * * * *